(12) United States Patent
Tang et al.

(10) Patent No.: US 11,353,893 B1
(45) Date of Patent: Jun. 7, 2022

(54) OBSTACLE AVOIDING METHOD AND APPARATUS FOR UNMANNED AERIAL VEHICLE BASED ON MULTI-SIGNAL ACQUISITION AND ROUTE PLANNING MODEL

(71) Applicant: Guangdong Polytechnic Normal University, Guangzhou (CN)

(72) Inventors: Yu Tang, Guangzhou (CN); Shaoming Luo, Guangzhou (CN); Qiwei Guo, Guangzhou (CN); Xincai Zhuang, Guangzhou (CN); Jiahao Li, Guangzhou (CN); Jiepeng Yang, Guangzhou (CN); Yiqing Fu, Guangzhou (CN); Chaojun Hou, Guangzhou (CN); Jiajun Zhuang, Guangzhou (CN); Aimin Miao, Guangzhou (CN); Xuan Chu, Guangzhou (CN); Huasheng Huang, Guangzhou (CN)

(73) Assignee: GUANGDONG POLYTECHNIC NORMAL UNIVERSITY, Guangzhou (CN)

( * ) Notice: Subject to any disclaimer, the term of this patent is extended or adjusted under 35 U.S.C. 154(b) by 0 days.

(21) Appl. No.: 17/468,864

(22) Filed: Sep. 8, 2021

(30) Foreign Application Priority Data

Nov. 24, 2020 (CN) .......................... 202011326513.3

(51) Int. Cl.
*G05D 1/10* (2006.01)
*B64C 39/02* (2006.01)
(Continued)

(52) U.S. Cl.
CPC ........... *G05D 1/106* (2019.05); *B64C 39/024* (2013.01); *G01S 13/862* (2013.01); *G01S 13/865* (2013.01);
(Continued)

(58) Field of Classification Search
USPC ............................................. 701/3
See application file for complete search history.

(56) References Cited

U.S. PATENT DOCUMENTS 10,928,830 B1 * 2/2021 Tran .................... G06K 9/00791
11,216,971 B2 * 1/2022 Xu .......................... G06K 9/629
(Continued)

FOREIGN PATENT DOCUMENTS

| CN | 105759836 A | 7/2016 |
|---|---|---|
| CN | 108427438 A | 8/2018 |

OTHER PUBLICATIONS

CN 202011326513.3—Notification of Granting Patent Right to the Invention, dated Jun. 17, 2021, 3 pages. (with English translation).
(Continued)

*Primary Examiner* — Tyler D Paige
(74) *Attorney, Agent, or Firm* — Getech Law LLC; Jun Ye (57) ABSTRACT

Disclosed is an obstacle avoiding method and apparatus for an unmanned aerial vehicle based on a multi-signal acquisition and route planning model. The method comprises: conducting signal acquisition processing on a first environmental area to obtain an initial millimeter-wave radar signal, an initial laser radar signal, an initial image signal and an initial ultrasonic signal; generating an initial three-dimensional environmental model according to a preset dynamic environment real-time modeling method; acquiring a motion parameter and a body shape parameter of the unmanned aerial vehicle and inputting the parameters into an initial
(Continued)

route planning model corresponding to the initial three-dimensional environmental model based on a genetic algorithm to process so as to obtain an output of the initial route planning model; judging whether the output is capable of avoiding an obstacle; if yes, generating an obstacle avoiding flight instruction to require the unmanned aerial vehicle to fly through the first environmental area.

4 Claims, 2 Drawing Sheets

(51) Int. Cl.
  *G01S 13/86*    (2006.01)
  *G01S 13/933*   (2020.01)
(52) U.S. Cl.
  CPC .......... *G01S 13/867* (2013.01); *G01S 13/933* (2020.01); *B64C 2201/141* (2013.01)

(56) References Cited

U.S. PATENT DOCUMENTS

| | | | | |
|---|---|---|---|---|
| 2015/0370251 | A1* | 12/2015 | Siegel | G05D 1/00 |
| | | | | 701/2 |
| 2017/0261999 | A1* | 9/2017 | Van Voorst | G06T 17/05 |
| 2019/0017838 | A1* | 1/2019 | Ryde | G05D 1/0246 |
| 2019/0138029 | A1* | 5/2019 | Ryll | G05D 1/101 |
| 2021/0343047 | A1* | 11/2021 | Li | H04N 19/176 |

OTHER PUBLICATIONS

CN 202011326513.3—First Office Action, dated May 26, 2021, 15 pages. (with English translation).

* cited by examiner

OBSTACLE AVOIDING METHOD AND APPARATUS FOR UNMANNED AERIAL VEHICLE BASED ON MULTI-SIGNAL ACQUISITION AND ROUTE PLANNING MODEL

TECHNICAL FIELD

The application relates to the field of computers, in particular to an obstacle avoiding method and apparatus for an unmanned aerial vehicle based on a multi-signal acquisition and route planning model, a computer device and a storage medium.

BACKGROUND

Featuring in lightness and flexibility, the unmanned aerial vehicles have been applied to various industries. In the flying process of the unmanned aerial vehicle, encountering an obstacle, it is needed to avoid the obstacle. An existing unmanned aerial vehicle obstacle avoiding scheme is to determine the position of the obstacle by means of a single signal acquisition means, and then the unmanned aerial vehicle flies in an obstacle avoiding manner. Thus, a conventional unmanned aerial vehicle obstacle avoiding scheme is narrow in application range. In a complex environment, for example, in a complex agricultural environment (if exist), it is hard to recognize the obstacle accurately and efficiently and fly in an obstacle avoiding manner accurately, such that the unmanned aerial vehicle has a greater potential safety hazard.

SUMMARY

The application provides an obstacle avoiding method for an unmanned aerial vehicle based on a multi-signal acquisition and route planning model, including the following steps:

S1, conducting signal acquisition processing on a first environmental area to obtain an initial millimeter-wave radar signal, an initial laser radar signal, an initial image signal and an initial ultrasonic signal by utilizing millimeter-wave radar, laser radar, a binocular vision camera and an ultrasonic transceiver pre-arranged on the unmanned aerial vehicle;

S2, generating an initial three-dimensional environmental model according to the initial millimeter-wave radar signal, the initial laser radar signal, the initial image signal and the initial ultrasonic signal and according to a preset dynamic environment real-time modeling method;

S3, acquiring a motion parameter and a body shape parameter of the unmanned aerial vehicle and inputting the parameters into an initial route planning model corresponding to the initial three-dimensional environmental model based on a genetic algorithm to process so as to obtain an output of the initial route planning model, wherein the motion parameter at least comprises a position parameter of the unmanned aerial vehicle, the output of the initial route planning model comprises incapability of avoiding an obstacle or capability of avoiding the obstacle, and when the output of the initial route planning model is incapability of avoiding the obstacle, the output of the initial route planning model is further provided with an initial obstacle avoiding route;

S4, judging whether the output is capable of avoiding an obstacle or not;

S5, if yes, generating an obstacle avoiding flight instruction to require the unmanned aerial vehicle to fly through the first environmental area in an obstacle avoiding manner along the initial obstacle avoiding route.

Further, the step S1 of conducting signal acquisition processing on a first environmental area to obtain an initial millimeter-wave radar signal, an initial laser radar signal, an initial image signal and an initial ultrasonic signal by utilizing millimeter-wave radar, laser radar, a binocular vision camera and an ultrasonic transceiver pre-arranged on the unmanned aerial vehicle includes:

S101, dividing the first environmental area into a first sub area, a second sub area, a third sub area and a fourth sub area, and respectively conducting signal acquisition processing on the first sub area, the second sub area, the third sub area and the fourth sub area by utilizing the millimeter-wave radar, laser radar, the binocular vision camera and the ultrasonic transceiver pre-arranged on the unmanned aerial vehicle to obtain the initial millimeter-wave radar signal, the initial laser radar signal, the initial image signal and the initial ultrasonic signal, wherein the first sub area and the fourth sub area are of axial symmetry about an axle wire of the unmanned aerial vehicle, and the second sub area and the third sub area are of axial symmetry about an axle wire of the unmanned aerial vehicle; and a first distance between a horizontal position of any one point in the first environmental area and a horizontal position of a head of the unmanned aerial vehicle is smaller than a second distance between a horizontal position of the point in the first environmental area and a horizontal position of a tail of the unmanned aerial vehicle;

after the step S4 of judging whether the output is capable of avoiding an obstacle or not, the method comprising:

S41, if the output of the initial route planning model is incapable of avoiding the obstacle, generating a hovering and overturning instruction of the unmanned aerial vehicle to require the unmanned aerial vehicle to hover and overturn at 180 degrees under a condition that a direction of the head is kept unchanged;

S42, respectively conducting signal acquisition processing on the fourth sub area, the third sub area, the second sub area and the first sub area by utilizing the millimeter-wave radar, laser radar, the binocular vision camera and the ultrasonic transceiver pre-arranged on the unmanned aerial vehicle to obtain a secondary millimeter-wave radar signal, a secondary laser radar signal, a secondary image signal and a secondary ultrasonic signal;

S43, generating a secondary three-dimensional environmental model according to the secondary millimeter-wave radar signal, the secondary laser radar signal, the secondary image signal and the secondary ultrasonic signal and according to the preset dynamic environment real-time modeling method;

S44, inputting the motion parameter and the body shape parameter of the unmanned aerial vehicle into a secondary route planning model corresponding to the secondary three-dimensional environmental model based on a genetic algorithm to process so as to obtain an output of the secondary route planning model, wherein the motion parameter at least comprises a position parameter of the unmanned aerial vehicle, the output of the secondary route planning model comprises incapability of avoiding an obstacle or capability of avoiding the obstacle, and when the output of the secondary route planning model is incapability of avoiding the obstacle, the output of the secondary route planning model is further provided with a secondary obstacle avoiding route;

S45, judging whether the output is capable of avoiding an obstacle or not;

S46, if yes, generating a secondary obstacle avoiding flight instruction to require the unmanned aerial vehicle to fly through the first environmental area in an obstacle avoiding manner along the secondary obstacle avoiding route.

Further, the step S2 of generating an initial three-dimensional environmental model according to the initial millimeter-wave radar signal, the initial laser radar signal, the initial image signal and the initial ultrasonic signal and according to a preset dynamic environment real-time modeling method includes:

S201, conducting dynamic environment real-time modeling processing by adopting a preset first spatial modeling tool according to the initial millimeter-wave radar signal and the initial image signal so as to obtain a first spatial model;

S202, meanwhile, conducting dynamic environment real-time modeling processing by adopting a preset second spatial modeling tool according to the initial millimeter-wave radar signal and the initial ultrasonic signal so as to obtain a second spatial model;

S203, combining the first spatial model with the second spatial model in parallel as an initial three-dimensional environment model;

the output of the initial route planning model comprises an output corresponding to the first spatial model and an output corresponding to the second spatial model; the output of the first spatial model comprises incapability of avoiding the obstacle or capability of avoiding the obstacle, and when the output of the first spatial model is capability of avoiding the obstacle, the output of the first spatial model is further provided with a first initial obstacle avoiding route; the output of the second spatial model comprises incapability of avoiding the obstacle or capability of avoiding the obstacle, and when the output of the second spatial model is capability of avoiding the obstacle, the output of the second spatial model is further provided with a second initial obstacle avoiding route; the step S4 of judging whether the output of the initial route planning model is capable of avoiding the obstacle or not comprises:

S401, judging whether both the output corresponding to the first spatial model and the output corresponding to the second spatial model are capable of avoiding the obstacle or not;

S402, if both the output corresponding to the first spatial model and the output corresponding to the second spatial model are capable of avoiding the obstacle, calculating a similarity value between the first initial obstacle avoiding route and the second initial obstacle avoiding route according to a preset route similarity calculating method;

S403, judging whether the similarity value between the first initial obstacle avoiding route and the second initial obstacle avoiding route is greater than a preset similarity threshold value or not; and S404, if the similarity value between the first initial obstacle avoiding route and the second initial obstacle avoiding route is greater than the preset similarity threshold value, judging that the output of the initial route planning model is capable of avoiding the obstacle.

Further, before the step of acquiring a motion parameter and a body shape parameter of the unmanned aerial vehicle and inputting the parameters into an initial route planning model corresponding to the initial three-dimensional environmental model based on a genetic algorithm to process so as to obtain an output of the initial route planning model, wherein the motion parameter at least includes a position parameter of the unmanned aerial vehicle, the output of the initial route planning model comprises incapability of avoiding an obstacle or capability of avoiding the obstacle, and when the output of the initial route planning model is incapability of avoiding the obstacle, the output of the initial route planning model is further provided with an initial obstacle avoiding route, the method includes:

S21, retrieving an appointed standard environment model the most similar to the initial three-dimensional environment model from a preset environment model base, wherein the environment model base pre-stores a plurality of standard environment models obtained by modeling a plurality of air obstacle environments;

S22, acquiring an appointed route planning model corresponding to the appointed standard environment model according to a mapping relationship between the preset standard environment model and the route planning model, wherein the different standard environment models correspond to different route planning models based on the genetic algorithm;

S23, marking the appointed route planning model as the initial route planning model and generating a route planning instruction, wherein the route planning instruction is used for indicating the motion parameter and the body shape parameter of the unmanned aerial vehicle and inputting the parameters into the initial route planning model corresponding to the initial three-dimensional environmental model based on the genetic algorithm to process.

Further, after the step S4 of judging whether the output is capable of avoiding an obstacle or not, the method including:

S411, if the output of the initial route planning model is incapable of avoiding the obstacle, controlling the unmanned aerial vehicle to retreat at a preset first horizontal length under a premise of keeping a current height;

S412, conducting signal acquisition processing on the second environmental area to obtain a third millimeter-wave radar signal, a third laser radar signal, a third image signal and a third ultrasonic signal by utilizing millimeter-wave radar, laser radar, a binocular vision camera and an ultrasonic transceiver pre-arranged on the unmanned aerial vehicle, wherein the second environmental area is an area obtained as the first environment area translates horizontally at the first horizontal length along a retreating direction of the unmanned aerial vehicle;

S413, generating a third three-dimensional environmental model according to the third millimeter-wave radar signal, the third laser radar signal, the third image signal and the third ultrasonic signal and according to the preset dynamic environment real-time modeling method;

S414, inputting the motion parameter and the body shape parameter of the unmanned aerial vehicle into a third route planning model corresponding to the third three-dimensional environmental model based on a genetic algorithm to process so as to obtain an output of the third route planning model, wherein the output of the third route planning model comprises incapability of avoiding an obstacle or capability of avoiding the obstacle, and when the output of the third route planning model is incapability of avoiding the obstacle, the output of the third route planning model is further provided with a third obstacle avoiding route;

S415, judging whether the output of the third route planning model is capable of avoiding an obstacle or not;

S416, if yes, generating a third obstacle avoiding flight instruction to require the unmanned aerial vehicle to fly through the second environmental area in an obstacle avoiding manner along the third obstacle avoiding route.

The application provides an obstacle avoiding apparatus for an unmanned aerial vehicle based on a multi-signal acquisition and route planning model, including:

an information acquisition unit for conducting signal acquisition processing on a first environmental area to obtain an initial millimeter-wave radar signal, an initial laser radar signal, an initial image signal and an initial ultrasonic signal by utilizing millimeter-wave radar, laser radar, a binocular vision camera and an ultrasonic transceiver pre-arranged on the unmanned aerial vehicle;

an initial three-dimensional environmental model generation unit for generating an initial three-dimensional environmental model according to the initial millimeter-wave radar signal, the initial laser radar signal, the initial image signal and the initial ultrasonic signal and according to a preset dynamic environment real-time modeling method;

an initial route planning model processing unit for acquiring a motion parameter and a body shape parameter of the unmanned aerial vehicle and inputting the parameters into an initial route planning model corresponding to the initial three-dimensional environmental model based on a genetic algorithm to process so as to obtain an output of the initial route planning model, wherein the motion parameter at least comprises a position parameter of the unmanned aerial vehicle, the output of the initial route planning model comprises incapability of avoiding an obstacle or capability of avoiding the obstacle, and when the output of the initial route planning model is incapability of avoiding the obstacle, the output of the initial route planning model is further provided with an initial obstacle avoiding route;

an obstacle avoiding judging unit for judging whether the output of the initial route planning model is capable of avoiding an obstacle or not; and an obstacle avoiding flight instruction generation unit for generating an obstacle avoiding flight instruction to require the unmanned aerial vehicle to fly through the first environmental area in an obstacle avoiding manner along the initial obstacle avoiding route if the output of the initial route planning model is capable of avoiding the obstacle.

The application provides a computer device, including a memory and a processor, the memory storing a computer program, wherein the processor realizes the steps of any one method when executing the computer program.

The application provides a computer readable storage medium, having computer readable instructions stored therein, wherein the steps of any one method is realized when the instructions are executed by the processor.

According to the obstacle avoiding method and apparatus for an unmanned aerial vehicle based on the multi-signal acquisition and route planning model, the computer device and the storage medium, the application provides an obstacle recognizing and avoiding method by combining a dynamic environment real-time modeling method and a genetic algorithm, which can be adapted to any feasible environment, in particular to a complex agricultural environment (the unmanned aerial vehicle needs to operate at a low altitude to come across obstacles which are not encountered by the common unmanned aerial vehicle, for example twigs), and the unmanned aerial vehicle is particularly integrated with millimeter-wave radar, laser radar, the binocular vision camera and the ultrasonic transceiver for signal acquisition, such that an integrated obstacle fast diagnosis model is established by making full use of characteristics of high millimeter-wave radar moving object capturing ability, high laser radar fine object sensitivity, a wide binocular vision near distance view, good ultrasonic near distance directivity and the like. A method for recognizing fixed fine obstacles and protruding obstacles based on an actual scene in a moving state of the unmanned aerial vehicle, an obstacle quick detection device integrating millimeter-wave radar, laser radar, binocular vision and ultrasonic waves is developed, and quick diagnosing and obstacle avoiding problems of the fine objects and protrusions are solved. The obstacle avoiding route planning is conducted in real time by combining the moving characteristics of the unmanned aerial vehicle, such that multidirectional effective obstacle avoidance of the unmanned aerial vehicle within a 0-12 m/s speed range is achieved.

Further description will be further made on implementation, functional characteristics and advantages of the object of the application with reference to drawings in combination of embodiments.

DETAILED DESCRIPTION

In order to make purposes, technical schemes and advantages of the disclosure clearer, the disclosure is further described in detail below in combination with drawings and embodiments. It should be understood that the specific examples described herein are merely used for explaining the disclosure, instead of limiting the disclosure.

Figure 1:
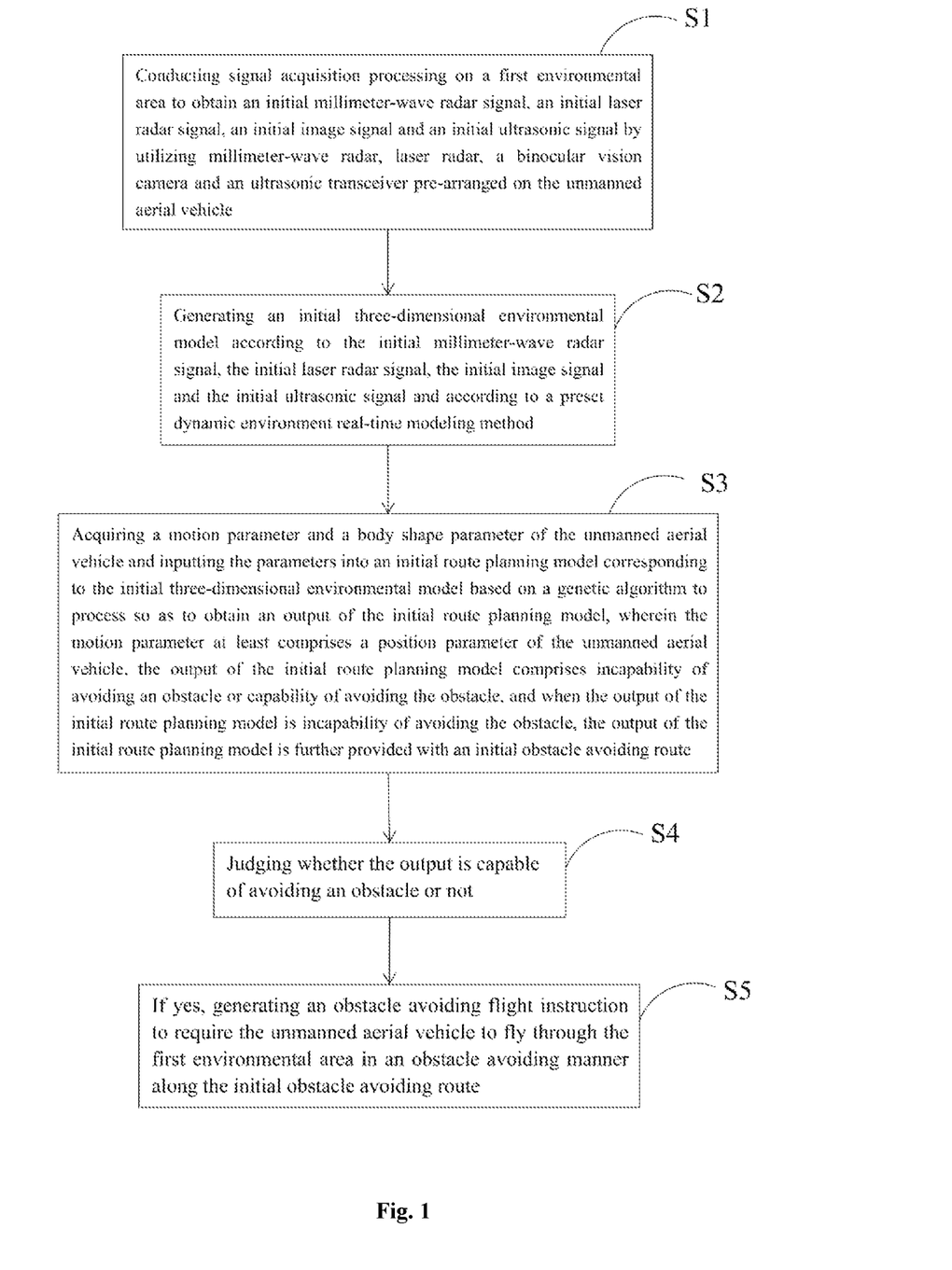
FIG. 1 is a flow diagram of an obstacle avoiding method for an unmanned aerial vehicle based on a multi-signal acquisition and route planning model of an embodiment of the application.

Referring to FIG. 1, the embodiment of the application provides an obstacle avoiding method for an unmanned aerial vehicle based on a multi-signal acquisition and route planning model, including the following steps:

S1, signal acquisition processing is conducted on a first environmental area to obtain an initial millimeter-wave radar signal, an initial laser radar signal, an initial image signal and an initial ultrasonic signal by utilizing millimeter-wave radar, laser radar, a binocular vision camera and an ultrasonic transceiver pre-arranged on the unmanned aerial vehicle;

S2, an initial three-dimensional environmental model is generated according to the initial millimeter-wave radar signal, the initial laser radar signal, the initial image signal and the initial ultrasonic signal and according to a preset dynamic environment real-time modeling method;

S3, a motion parameter and a body shape parameter of the unmanned aerial vehicle are acquired and the parameters are input into an initial route planning model corresponding to the initial three-dimensional environmental model based on a genetic algorithm to process so as to obtain an output of the initial route planning model, wherein the motion parameter at least includes a position parameter of the unmanned aerial vehicle, the output of the initial route planning model comprises incapability of avoiding an obstacle or capability of avoiding the obstacle, and when the output of the initial route planning model is incapability of avoiding the obstacle, the output of the initial route planning model is further provided with an initial obstacle avoiding route;

S4, whether the output is capable of avoiding an obstacle or not is judged;

S5, if yes, an obstacle avoiding flight instruction is generated to require the unmanned aerial vehicle to fly through the first environmental area in an obstacle avoiding manner along the initial obstacle avoiding route;

As described by the steps S1-S2, signal acquisition processing is conducted on the first environmental area to obtain the initial millimeter-wave radar signal, the initial laser radar signal, the initial image signal and the initial ultrasonic signal by utilizing millimeter-wave radar, laser radar, a binocular vision camera and an ultrasonic transceiver pre-arranged on the unmanned aerial vehicle; and an initial three-dimensional environmental model is generated according to the initial millimeter-wave radar signal, the initial laser radar signal, the initial image signal and the initial ultrasonic signal and according to the preset dynamic environment real-time modeling method. According to the application, the millimeter-wave radar, the laser radar, the binocular vision camera and the ultrasonic transceiver are particularly selected to conduct signal acquisition processing simultaneously, such that it is probable to acquire full and accurate obstacle information in a complex air environment (for example in an agricultural environment) within a short time by means of characteristics of high millimeter-wave radar moving object capturing ability, high laser radar fine object sensitivity, a wide binocular vision near distance view, good ultrasonic near distance directivity and the like. Further, the reason that the millimeter-wave radar, the laser radar, the binocular vision camera and the ultrasonic transceiver are particularly selected to conduct signal acquisition processing simultaneously is not only that, and is different as the specific execution process is different. Therefore, detailed description will be made subsequently in combination of specific steps. The dynamic environment real-time modeling method may adopt any feasible method, for example, an existing three-dimensional spatial modeling tool is adopted to conduct modeling processing. As sufficient signal data in the environment has been acquired, an initial three-dimensional environment model with an obstacle (or the signal data shows that there is no obstacle) can be simulated. However, the application is characterized in real time modeling, which is due to signal acquisition processing by four different signal collectors, such that the environment signal is full enough. Thus, signal void can be avoided, and therefore, it is probable to model in real time.

Further, the step S1 of conducting signal acquisition processing on a first environmental area to obtain an initial millimeter-wave radar signal, an initial laser radar signal, an initial image signal and an initial ultrasonic signal by utilizing millimeter-wave radar, laser radar, a binocular vision camera and an ultrasonic transceiver pre-arranged on the unmanned aerial vehicle includes:

S101, dividing the first environmental area into a first sub area, a second sub area, a third sub area and a fourth sub area, and respectively conducting signal acquisition processing on the first sub area, the second sub area, the third sub area and the fourth sub area by utilizing the millimeter-wave radar, laser radar, the binocular vision camera and the ultrasonic transceiver pre-arranged on the unmanned aerial vehicle to obtain the initial millimeter-wave radar signal, the initial laser radar signal, the initial image signal and the initial ultrasonic signal, wherein the first sub area and the fourth sub area are of axial symmetry about an axle wire of the unmanned aerial vehicle, and the second sub area and the third sub area are of axial symmetry about an axle wire of the unmanned aerial vehicle; and a first distance between a horizontal position of any one point in the first environmental area and a horizontal position of a head of the unmanned aerial vehicle is smaller than a second distance between a horizontal position of the point in the first environmental area and a horizontal position of a tail of the unmanned aerial vehicle;

after the step S4 of judging whether the output is capable of avoiding an obstacle or not, the method comprising:

S41, if the output of the initial route planning model is incapable of avoiding the obstacle, generating a hovering and overturning instruction of the unmanned aerial vehicle to require the unmanned aerial vehicle to hover and overturn at 180 degrees under a condition that a direction of the head is kept unchanged;

S42, respectively conducting signal acquisition processing on the fourth sub area, the third sub area, the second sub area and the first sub area by utilizing the millimeter-wave radar, laser radar, the binocular vision camera and the ultrasonic transceiver pre-arranged on the unmanned aerial vehicle to obtain a secondary millimeter-wave radar signal, a secondary laser radar signal, a secondary image signal and a secondary ultrasonic signal;

S43, generating a secondary three-dimensional environmental model according to the secondary millimeter-wave radar signal, the secondary laser radar signal, the secondary image signal and the secondary ultrasonic signal and according to the preset dynamic environment real-time modeling method;

S44, inputting the motion parameter and the body shape parameter of the unmanned aerial vehicle into a secondary route planning model corresponding to the secondary three-dimensional environmental model based on a genetic algorithm to process so as to obtain an output of the secondary route planning model, wherein the motion parameter at least comprises a position parameter of the unmanned aerial vehicle, the output of the secondary route planning model comprises incapability of avoiding an obstacle or capability of avoiding the obstacle, and when the output of the secondary route planning model is incapability of avoiding the obstacle, the output of the secondary route planning model is further provided with a secondary obstacle avoiding route;

S45, judging whether the output is capable of avoiding an obstacle or not;

S46, if yes, generating a secondary obstacle avoiding flight instruction to require the unmanned aerial vehicle to fly through the first environmental area in an obstacle avoiding manner along the secondary obstacle avoiding route.

Therefore, signals are utilized fully, such that the obstacle avoiding flight of the application is more accurate and efficient. As above-mentioned hereinbefore, the four signal acquisition modes of the application are different in specific execution processes, and reasons and advantages thereof are different. Here, signal acquisition is conducted by dividing sub areas. Specifically, if signal acquisition processing in all areas of the first environment area is conducted respectively by adopting the millimeter-wave radar, the laser radar, the binocular vision camera and the ultrasonic transceiver. It is no doubt that the most sufficient signal data can be acquired, and it takes a relatively long time. The unmanned aerial vehicle of the application is in a moving state, such that the shorter signal acquisition time is more favorable. Hereby, the first environment area is divided into a first sub area, a second sub area, a third sub area and a fourth sub area and signal acquisition processing is conducted respectively on the first sub area, the second sub area, the third sub area and the fourth sub area by utilizing the millimeter-wave radar, the laser radar, the binocular vision camera and the ultrasonic transceiver pre-arranged on the unmanned aerial vehicle to obtain ways of an initial millimeter-wave radar signal, an initial laser radar signal, an initial image signal and an initial ultrasonic signal, such that each signal collector only needs to acquire signals in part of areas. Meanwhile, as the four signal collectors are different in advantage, it is only needed to find a smooth air road actually for obstacle avoidance of the unmanned aerial vehicle, which is not high in requirement on the intact spatial model. Therefore, by adopting the way of the application, it is probable to find a proper obstacle avoiding route in a certain sub area to avoid the obstacle accurately and it is shorter in total time consumption. Further, the application adopting the above-mentioned arrangement further has the advantage that under a condition that the output of the initial route planning model is incapable of avoiding the obstacle, it is only needed to hover the unmanned aerial vehicle and overturn the unmanned aerial vehicle at 180 degrees by keeping the direction of the head unchanged, such that the four different signal collectors can conduct signal acquisition in the other sub different area to conduct modeling and obstacle avoiding judgment again. At the time, the total time needed to acquire the signals can be also saved by half.

Further, the step S2 of generating an initial three-dimensional environmental model according to the initial millimeter-wave radar signal, the initial laser radar signal, the initial image signal and the initial ultrasonic signal and according to a preset dynamic environment real-time modeling method includes:

S201, conducting dynamic environment real-time modeling processing by adopting a preset first spatial modeling tool according to the initial millimeter-wave radar signal and the initial image signal so as to obtain a first spatial model;

S202, meanwhile, conducting dynamic environment real-time modeling processing by adopting a preset second spatial modeling tool according to the initial millimeter-wave radar signal and the initial ultrasonic signal so as to obtain a second spatial model;

S203, combining the first spatial model with the second spatial model in parallel as an initial three-dimensional environment model;

the output of the initial route planning model comprises an output corresponding to the first spatial model and an output corresponding to the second spatial model; the output of the first spatial model comprises incapability of avoiding the obstacle or capability of avoiding the obstacle, and when the output of the first spatial model is capability of avoiding the obstacle, the output of the first spatial model is further provided with a first initial obstacle avoiding route; the output of the second spatial model comprises incapability of avoiding the obstacle or capability of avoiding the obstacle, and when the output of the second spatial model is capability of avoiding the obstacle, the output of the second spatial model is further provided with a second initial obstacle avoiding route; the step S4 of judging whether the output of the initial route planning model is capable of avoiding the obstacle or not comprises:

S401, judging whether both the output corresponding to the first spatial model and the output corresponding to the second spatial model are capable of avoiding the obstacle or not;

S402, if both the output corresponding to the first spatial model and the output corresponding to the second spatial model are capable of avoiding the obstacle, calculating a similarity value between the first initial obstacle avoiding route and the second initial obstacle avoiding route according to a preset route similarity calculating method;

S403, judging whether the similarity value between the first initial obstacle avoiding route and the second initial obstacle avoiding route is greater than a preset similarity threshold value or not; and S404, if the similarity value between the first initial obstacle avoiding route and the second initial obstacle avoiding route is greater than the preset similarity threshold value, judging that the output of the initial route planning model is capable of avoiding the obstacle.

Therefore, it is more accurate to judge obstacle avoidance. As above-mentioned hereinbefore, the four signal acquisition modes of the application are different in specific execution processes, and reasons and advantages thereof are different. Here, the initial millimeter-wave radar signal and the initial image signal are grouped to model, and then the initial laser radar signal and the initial ultrasonic signal are grouped to model. By fully considering the initial millimeter-wave radar signal, the initial laser radar signal, the initial image signal and the initial ultrasonic signal to establish a single spatial model, as it is needed to consider the difference in the four signals, it takes a long time to establish the spatial model, which is disadvantageous to the integral obstacle avoiding scheme. Therefore, as the initial millimeter-wave radar signal and the initial image signal are grouped to model, and then the initial laser radar signal and the initial ultrasonic signal are grouped to model, it is only consider a difference between the two signals. Meanwhile, the four signals will have positive influence to final obstacle avoiding judgment, and therefore, information loss is not caused. Further, here, it has a further important characteristic that in particular, initial millimeter-wave radar signal and the initial image signal are grouped to model, and then the initial laser radar signal and the initial ultrasonic signal are grouped to model. It is because of higher similarity between the model established by grouping the initial millimeter-wave radar signal and the initial image signal and a true space in an efficient modeling process within a short time and higher similarity between the model established by grouping the initial laser radar signal and the initial ultrasonic signal and the true space, which may be associated with characteristics of high millimeter-wave radar moving object capturing ability, high laser radar fine object sensitivity, a wide binocular vision near distance view, good ultrasonic near distance directivity and the like. A more specific principle is still under analysis, which is yet a finding of the application. The similarity value between the first initial obstacle avoiding route and the second initial obstacle avoiding route can be calculated by any feasible method according to the preset route similarity calculation method, for example, a length difference value and an angle difference value are calculated respectively as being divided into limited line segments and then the similarity value of a whole curve is calculated comprehensively, which is actually similarity calculation between two curved, and is not described repeatedly herein.

As described in the step S3, a motion parameter and a body shape parameter of the unmanned aerial vehicle are acquired and the parameters are input into an initial route planning model corresponding to the initial three-dimensional environmental model based on a genetic algorithm to process so as to obtain an output of the initial route planning model, wherein the motion parameter at least includes a position parameter of the unmanned aerial vehicle, the output of the initial route planning model comprises incapability of avoiding an obstacle or capability of avoiding the obstacle, and when the output of the initial route planning model is incapability of avoiding the obstacle, the output of the initial route planning model is further provided with an initial obstacle avoiding route. The motion parameter, for example is position, speed, acceleration and the like of the unmanned aerial vehicle, and the body shape parameter, for example, a total length of a body, a width and a height of the body and the like. It is because of a relatively small obstacle avoiding space in the obstacle avoiding process, and therefore, it is needed to consider the motion parameter and the body shape parameter comprehensively to determine whether the unmanned aerial vehicle can pass through or not. The application adopts the initial route planning mode corresponding to the initial three-dimensional environmental model based on the genetic algorithm to judge whether the unmanned aerial vehicle can avoid the obstacle or not and calculate the obstacle avoiding route by utilizing a machine learning model. The genetic algorithm is a method of searching for the optimum solution by simulating a natural evolutionary process, which has a lot of failure examples in an initial training stage. New training every time may inherit experience of the previous failure sample till the feasible obstacle avoiding flight route can be obtained finally.

Further, before the step of acquiring a motion parameter and a body shape parameter of the unmanned aerial vehicle and inputting the parameters into an initial route planning model corresponding to the initial three-dimensional environmental model based on a genetic algorithm to process so as to obtain an output of the initial route planning model, wherein the motion parameter at least includes a position parameter of the unmanned aerial vehicle, the output of the initial route planning model comprises incapability of avoiding an obstacle or capability of avoiding the obstacle, and when the output of the initial route planning model is incapability of avoiding the obstacle, the output of the initial route planning model is further provided with an initial obstacle avoiding route, the method includes:

S21, retrieving an appointed standard environment model the most similar to the initial three-dimensional environment model from a preset environment model base, wherein the environment model base pre-stores a plurality of standard environment models obtained by modeling a plurality of air obstacle environments;

S22, acquiring an appointed route planning model corresponding to the appointed standard environment model according to a mapping relationship between the preset standard environment model and the route planning model, wherein the different standard environment models correspond to different route planning models based on the genetic algorithm;

S23, marking the appointed route planning model as the initial route planning model and generating a route planning instruction, wherein the route planning instruction is used for indicating the motion parameter and the body shape parameter of the unmanned aerial vehicle and inputting the parameters into the initial route planning model corresponding to the initial three-dimensional environmental model based on the genetic algorithm to process.

Therefore, the initial route planning model is obtained. It should be noted that it is hard to apply the genetic algorithm in a common real-time obstacle avoiding scheme of the unmanned aerial vehicle because the genetic algorithm can be regarded as a trial and error algorithm which inherits experience of failed simulated flight previously till the feasible obstacle avoiding flight route can be obtained finally. As far as common real time obstacle avoidance of the unmanned aerial vehicle is concerned, as the spatial environment is a novel environment and it is needed to obtain the obstacle avoiding route within a short time in a flight state, it is contradicted with the mode based on a genetic algorithm which takes a long time. An environment model base is established in advance. The environment model base pre-stores a plurality of standard environment models obtained by modeling a plurality of air obstacle environments, such that the spatial environment of the unmanned aerial vehicle is a known standard environment (the quantity of models of the standard environment modes is enough and the specificity is high enough, and in particular, common environments of the unmanned aerial vehicle of the application are collected in a targeted manner to model). Training on the machine learning model based on genetic algorithm is conducted on these standard environment models respectively, such that corresponding route planning models are obtained respectively after training of enough rounds is conducted, and meanwhile, a mapping relationship between the standard environment model and the route planning model can be established. An appointed route planning model corresponding to the appointed standard environment model can be obtained according to the mapping relationship between the standard environment model and the route planning model, and then the appointed route planning model is marked as the initial route planning model.

As described in the steps S4-S5, whether the output of the initial route planning model is capable of avoiding the obstacle or not is judged; if yes, an obstacle avoiding flight instruction is generated to require the unmanned aerial vehicle to fly through the first environmental area in an obstacle avoiding manner along the initial obstacle avoiding route. S5, as the output of the initial route planning model is capable of avoiding the obstacle and the output of the initial route planning model is provided with the initial obstacle avoiding route, the unmanned aerial vehicle only needs to fly in an obstacle avoiding manner along the initial obstacle avoiding path to fly through the first environmental area to complete the obstacle avoiding task.

Further, after the step S4 of judging whether the output is capable of avoiding an obstacle or not, the method including:

S411, if the output of the initial route planning model is incapable of avoiding the obstacle, controlling the unmanned aerial vehicle to retreat at a preset first horizontal length under a premise of keeping a current height;

S412, conducting signal acquisition processing on the second environmental area to obtain a third millimeter-wave radar signal, a third laser radar signal, a third image signal and a third ultrasonic signal by utilizing millimeter-wave radar, laser radar, a binocular vision camera and an ultrasonic transceiver pre-arranged on the unmanned aerial vehicle, wherein the second environmental area is an area obtained as the first environment area translates horizontally at the first horizontal length along a retreating direction of the unmanned aerial vehicle;

S413, generating a third three-dimensional environmental model according to the third millimeter-wave radar signal, the third laser radar signal, the third image signal and the third ultrasonic signal and according to the preset dynamic environment real-time modeling method;

S414, inputting the motion parameter and the body shape parameter of the unmanned aerial vehicle into a third route planning model corresponding to the third three-dimensional environmental model based on a genetic algorithm to process so as to obtain an output of the third route planning model, wherein the output of the third route planning model comprises incapability of avoiding an obstacle or capability of avoiding the obstacle, and when the output of the third route planning model is incapability of avoiding the obstacle, the output of the third route planning model is further provided with a third obstacle avoiding route;

S415, judging whether the output of the third route planning model is capable of avoiding an obstacle or not;

S416, if yes, generating a third obstacle avoiding flight instruction to require the unmanned aerial vehicle to fly through the second environmental area in an obstacle avoiding manner along the third obstacle avoiding route.

Therefore, the unmanned aerial vehicle flies in an obstacle avoiding manner again. When the unmanned aerial vehicle encounters the obstacle, for example, a high density bush, the bush blocks all routes in front, such that the output of the initial route planning model is incapable of avoiding the obstacle. At the time, the unmanned aerial vehicle avoids the obstacle again in a special manner, i.e., the unmanned aerial vehicle is controlled to retreat at a preset first horizontal length under the premise of keeping a current height. On this basis, signal acquisition, three-dimensional environment modeling, obstacle avoiding judgment and obstacle avoiding flight are conducted again. As the unmanned aerial vehicle retreats at the preset first horizontal length, the obstacle avoiding environment of the unmanned aerial vehicle is improved, and as the unmanned aerial vehicle retreats at the preset first horizontal length, the safety of the unmanned aerial vehicle can be guaranteed. Therefore, the unmanned aerial vehicle avoids the obstacle by adopting a policy of retreating in order to advance.

According to the obstacle avoiding method for an unmanned aerial vehicle based on the multi-signal acquisition and route planning model, the application provides an obstacle recognizing and avoiding method by combining a dynamic environment real-time modeling method and a genetic algorithm, which can be adapted to any feasible environment, in particular to a complex agricultural environment (the unmanned aerial vehicle needs to operate at a low altitude to come across obstacles which are not encountered by the common unmanned aerial vehicle, for example twigs), and the unmanned aerial vehicle is particularly integrated with millimeter-wave radar, laser radar, the binocular vision camera and the ultrasonic transceiver for signal acquisition, such that an integrated obstacle fast diagnosis model is established by making full use of characteristics of high millimeter-wave radar moving object capturing ability, high laser radar fine object sensitivity, a wide binocular vision near distance view, good ultrasonic near distance directivity and the like. A method for recognizing fixed fine obstacles and protruding obstacles based on an actual scene in a moving state of the unmanned aerial vehicle, an obstacle quick detection device integrating millimeter-wave radar, laser radar, binocular vision and ultrasonic waves is developed, and quick diagnosing and obstacle avoiding problems of the fine objects and protrusions are solved. The obstacle avoiding route planning is conducted in real time by combining the moving characteristics of the unmanned aerial vehicle, such that multidirectional effective obstacle avoidance of the unmanned aerial vehicle within a 0-12 m/s speed range is achieved.

Figure 2:
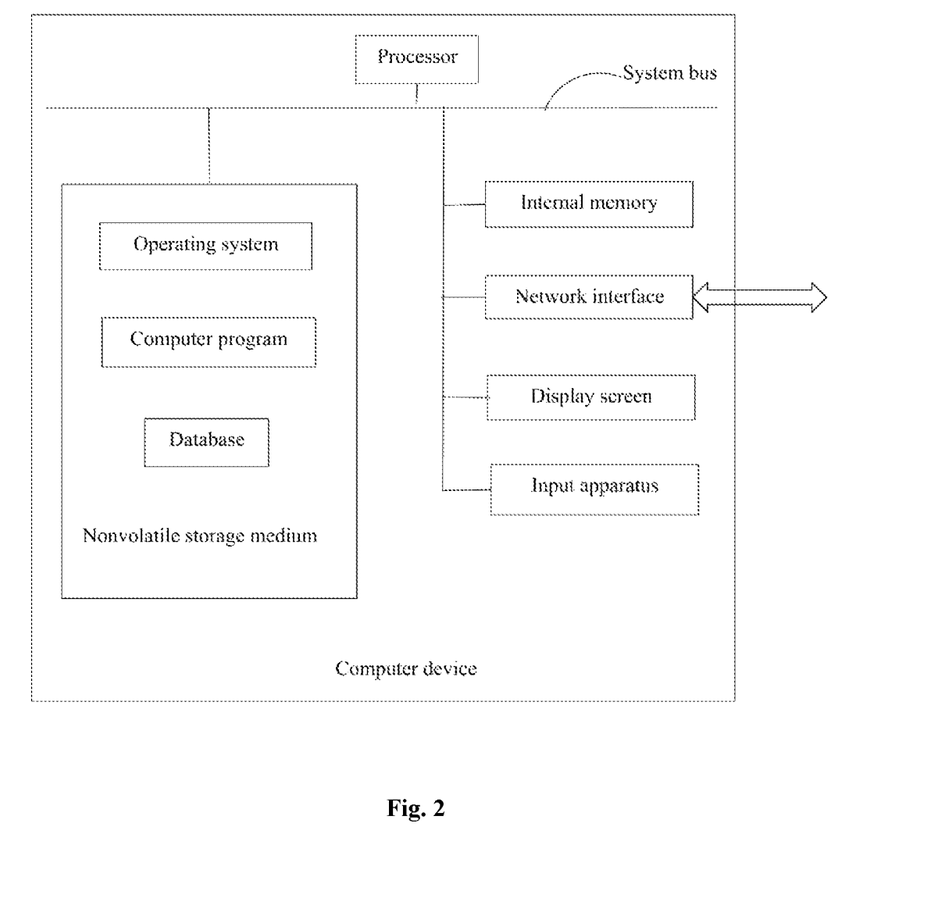
FIG. 2 is a structural schematic block diagram of the computer device of an embodiment of the application.

Referring to FIG. 2, the embodiment of the application provides an obstacle avoiding apparatus for an unmanned aerial vehicle based on a multi-signal acquisition and route planning model, including the following steps:

an information acquisition unit for conducting signal acquisition processing on a first environmental area to obtain an initial millimeter-wave radar signal, an initial laser radar signal, an initial image signal and an initial ultrasonic signal by utilizing millimeter-wave radar, laser radar, a binocular vision camera and an ultrasonic transceiver pre-arranged on the unmanned aerial vehicle;

an initial three-dimensional environmental model generation unit for generating an initial three-dimensional environmental model according to the initial millimeter-wave radar signal, the initial laser radar signal, the initial image signal and the initial ultrasonic signal and according to a preset dynamic environment real-time modeling method;

an initial route planning model processing unit for acquiring a motion parameter and a body shape parameter of the unmanned aerial vehicle and inputting the parameters into an initial route planning model corresponding to the initial three-dimensional environmental model based on a genetic algorithm to process so as to obtain an output of the initial route planning model, wherein the motion parameter at least comprises a position parameter of the unmanned aerial vehicle, the output of the initial route planning model comprises incapability of avoiding an obstacle or capability of avoiding the obstacle, and when the output of the initial route planning model is incapability of avoiding the obstacle, the output of the initial route planning model is further provided with an initial obstacle avoiding route;

an obstacle avoiding judging unit for judging whether the output of the initial route planning model is capable of avoiding an obstacle or not; and an obstacle avoiding flight instruction generation unit for generating an obstacle avoiding flight instruction to require the unmanned aerial vehicle to fly through the first environmental area in an obstacle avoiding manner along the initial obstacle avoiding route if the output of the initial route planning model is capable of avoiding the obstacle.

Operations for execution by the units correspond to the steps of the obstacle avoiding method for an unmanned aerial vehicle based on a multi-signal acquisition and route planning model of the previous embodiment one by one, which is not described repeatedly herein.

According to the obstacle avoiding apparatus for an unmanned aerial vehicle based on the multi-signal acquisition and route planning model, the application provides an obstacle recognizing and avoiding method by combining a dynamic environment real-time modeling method and a genetic algorithm, which can be adapted to any feasible environment, in particular to a complex agricultural environment (the unmanned aerial vehicle needs to operate at a low altitude to come across obstacles which are not encountered by the common unmanned aerial vehicle, for example twigs), and the unmanned aerial vehicle is particularly integrated with millimeter-wave radar, laser radar, the binocular vision camera and the ultrasonic transceiver for signal acquisition, such that an integrated obstacle fast diagnosis model is established by making full use of characteristics of high millimeter-wave radar moving object capturing ability, high laser radar fine object sensitivity, a wide binocular vision near distance view, good ultrasonic near distance directivity and the like. A method for recognizing fixed fine obstacles and protruding obstacles based on an actual scene in a moving state of the unmanned aerial vehicle, an obstacle quick detection device integrating millimeter-wave radar, laser radar, binocular vision and ultrasonic waves is developed, and quick diagnosing and obstacle avoiding problems of the fine objects and protrusions are solved. The obstacle avoiding route planning is conducted in real time by combining the moving characteristics of the unmanned aerial vehicle, such that multidirectional effective obstacle avoidance of the unmanned aerial vehicle within a 0-12 m/s speed range is achieved.

Referring to FIG. 2, the embodiment of the present invention further provides a computer device, wherein the computer device can be a server, the internal structure of which may be shown in a figure. The computer device includes a processor, a memory, a network interface and a database connected via a system bus. The processor designed by the computer is used for providing calculation and control abilities. The memory of the computer device includes a nonvolatile storage medium and an internal memory. The nonvolatile storage medium stores an operating system, a computer program and a database. The internal memory provides an environment for operation of the operating system and the computer program in the nonvolatile storage medium. The database of the computer device is used for storing data used by the obstacle avoiding method for an unmanned aerial vehicle based on the multi-signal acquisition and route planning model. The network interface of the computer device is used for connected communication with an external terminal via a network. The computer program is executed by the processor to implement the obstacle avoiding method for an unmanned aerial vehicle based on the multi-signal acquisition and route planning model.

The processor executes the obstacle avoiding method for an unmanned aerial vehicle based on a multi-signal acquisition and route planning model, wherein the steps included in the step correspond to the steps of the obstacle avoiding method for an unmanned aerial vehicle based on a multi-signal acquisition and route planning model executing the previous embodiment one by one, which is not described repeatedly herein.

Those skilled in the art can understand that the structure illustrated in the figure is merely a block diagram of a partial structure related to the scheme of the application and does not constitute limitation to the computer device in the scheme of the application applied thereto.

According to the computer device, the application provides an obstacle recognizing and avoiding method by combining a dynamic environment real-time modeling method and a genetic algorithm, which can be adapted to any feasible environment, in particular to a complex agricultural environment (the unmanned aerial vehicle needs to operate at a low altitude to come across obstacles which are not encountered by the common unmanned aerial vehicle, for example twigs), and the unmanned aerial vehicle is particularly integrated with millimeter-wave radar, laser radar, the binocular vision camera and the ultrasonic transceiver for signal acquisition, such that an integrated obstacle fast diagnosis model is established by making full use of characteristics of high millimeter-wave radar moving object capturing ability, high laser radar fine object sensitivity, a wide binocular vision near distance view, good ultrasonic near distance directivity and the like. A method for recognizing fixed fine obstacles and protruding obstacles based on an actual scene in a moving state of the unmanned aerial vehicle, an obstacle quick detection device integrating millimeter-wave radar, laser radar, binocular vision and ultrasonic waves is developed, and quick diagnosing and obstacle avoiding problems of the fine objects and protrusions are solved. The obstacle avoiding route planning is conducted in real time by combining the moving characteristics of the unmanned aerial vehicle, such that multidirectional effective obstacle avoidance of the unmanned aerial vehicle within a 0-12 m/s speed range is achieved.

An embodiment of the application further provides a computer readable storage medium, having the computer program stored thereon, the computer program is executed by the processor to realize the obstacle avoiding method for an unmanned aerial vehicle based on a multi-signal acquisition and route planning model, wherein the steps included in the step correspond to the steps of the obstacle avoiding method for an unmanned aerial vehicle based on a multi-signal acquisition and route planning model executing the previous embodiment one by one, which is not described repeatedly herein.

According to the computer readable storage medium, the application provides an obstacle recognizing and avoiding method by combining a dynamic environment real-time modeling method and a genetic algorithm, which can be adapted to any feasible environment, in particular to a complex agricultural environment (the unmanned aerial vehicle needs to operate at a low altitude to come across obstacles which are not encountered by the common unmanned aerial vehicle, for example twigs), and the unmanned aerial vehicle is particularly integrated with millimeter-wave radar, laser radar, the binocular vision camera and the ultrasonic transceiver for signal acquisition, such that an integrated obstacle fast diagnosis model is established by making full use of characteristics of high millimeter-wave radar moving object capturing ability, high laser radar fine object sensitivity, a wide binocular vision near distance view, good ultrasonic near distance directivity and the like. A method for recognizing fixed fine obstacles and protruding obstacles based on an actual scene in a moving state of the unmanned aerial vehicle, an obstacle quick detection device integrating millimeter-wave radar, laser radar, binocular vision and ultrasonic waves is developed, and quick diagnosing and obstacle avoiding problems of the fine objects and protrusions are solved. The obstacle avoiding route planning is conducted in real time by combining the moving characteristics of the unmanned aerial vehicle, such that multidirectional effective obstacle avoidance of the unmanned aerial vehicle within a 0-12 m/s speed range is achieved.

Those skilled in the art can understand that implementation of all or part of flows in the method of the embodiment is completed by means of hardware related to the computer program or instruction. The computer program can be stored in a nonvolatile computer readable storage medium. When the computer program is executed, it can include the flows of the embodiments of the methods. Any citation of the memory, storage, database or other media provided by the application and used in the embodiments can include a nonvolatile and/or volatile memory. The nonvolatile memory can include read-only memory (ROM), programmable ROM (PROM), electrical programmable ROM (EPROM), an erasable programmable ROM (EEPROM) or a flash memory. The volatile memory can include a random access memory (Ram) or an external high speed cache memory. As description rather than limitation, the RAM can be obtained in various forms, for example, a static RAM (SRAM), a dynamic RAM (DRAM), a synchronous DRAM (SDRAM), a double data rate SDRM (SSRSDRAM), an enhanced SDRAM (ESDRAM), a synchronization link (Synchlink) DRAM (SLDRAM), a memory bus (Rambus), a direct RAM (RDRAM), a direct memory bus dynamic RAM (DRDRAM), a memory bus dynamic RAM (RDRAM) and the like.

It should be noted that the terms "comprises", "include" or any other variants herein are intended to cover nonexcludable inclusion, such that the process, apparatus, article or method including a series of elements only includes the elements, but also includes other elements which are not limited clearly, or further includes all inherent elements of the process, apparatus, article or method. Under a circumstance of no more limitations, for the elements defined by the term "include one", a condition that there are additional same elements in the process, apparatus, article or method including the elements is not excluded.

The above is merely preferred embodiments of the application and does not hence limit the patent range of the application. Equivalent structure or equivalent flow conversion made by means of the contents of the description and drawings of the application are applied to other related technical fields directly or indirectly, which is, in a similar way, comprised in the protection scope of the patent of the application.

What is claimed:

1. A non-transitory computer-readable medium storing computer executable instructions for an unmanned aerial vehicle based on a multi-signal acquisition and route planning model that when executed by a computer, cause it to perform a method, comprising:

conducting signal acquisition processing on a first environmental area to obtain an initial millimeter-wave radar signal, an initial laser radar signal, an initial image signal and an initial ultrasonic signal by utilizing millimeter-wave radar, laser radar, a binocular vision camera and an ultrasonic transceiver pre-arranged on the unmanned aerial vehicle;

generating an initial three-dimensional environmental model according to the initial millimeter-wave radar signal, the initial laser radar signal, the initial image signal and the initial ultrasonic signal and according to a preset dynamic environment real-time modeling method;

acquiring a motion parameter and a body shape parameter of the unmanned aerial vehicle and inputting the parameters into an initial route planning model corresponding to the initial three-dimensional environmental model based on a genetic algorithm to process so as to obtain an output of the initial route planning model, wherein the motion parameter at least comprises a position parameter of the unmanned aerial vehicle, the output of the initial route planning model comprises incapability of avoiding an obstacle or capability of avoiding the obstacle, and when the output of the initial route planning model is incapability of avoiding the obstacle, the output of the initial route planning model is further provided with an initial obstacle avoiding route;

judging whether the output is capable of avoiding an obstacle or not; and generating an obstacle avoiding flight instruction, based on a determination that the output is capable of avoiding the obstacle, to require the unmanned aerial vehicle to fly through the first environmental area in an obstacle avoiding manner along the initial obstacle avoiding route;

the conducting signal acquisition processing on a first environmental area to obtain an initial millimeter-wave radar signal, an initial laser radar signal, an initial image signal and an initial ultrasonic signal by utilizing millimeter-wave radar, laser radar, a binocular vision camera and an ultrasonic transceiver pre-arranged on the unmanned aerial vehicle comprises:

dividing the first environmental area into a first sub area, a second sub area, a third sub area and a fourth sub area, and respectively conducting signal acquisition processing on the first sub area, the second sub area, the third sub area and the fourth sub area by utilizing the millimeter-wave radar, laser radar, the binocular vision camera and the ultrasonic transceiver pre-arranged on the unmanned aerial vehicle to obtain the initial millimeter-wave radar signal, the initial laser radar signal, the initial image signal and the initial ultrasonic signal, wherein the first sub area and the fourth sub area are of axial symmetry about an axle wire of the unmanned aerial vehicle, and the second sub area and the third sub area are of axial symmetry about an axle wire of the unmanned aerial vehicle; and a first distance between a horizontal position of any one point in the first environmental area and a horizontal position of a head of the unmanned aerial vehicle is smaller than a second distance between a horizontal position of the point in the first environmental area and a horizontal position of a tail of the unmanned aerial vehicle; and after the step S4 of judging whether the output is capable of avoiding an obstacle or not, the method comprising:

generating a hovering and overturning instruction of the unmanned aerial vehicle, based on a determination that the output of the initial route planning model is incapable of avoiding the obstacle, to require the unmanned aerial vehicle to hover and overturn at 180 degrees under a condition that a direction of the head is kept unchanged;

respectively conducting signal acquisition processing on the fourth sub area, the third sub area, the second sub area and the first sub area by utilizing the millimeter-wave radar, laser radar, the binocular vision camera and the ultrasonic transceiver pre-arranged on the unmanned aerial vehicle to obtain a secondary millimeter-wave radar signal, a secondary laser radar signal, a secondary image signal and a secondary ultrasonic signal;

generating a secondary three-dimensional environmental model according to the secondary millimeter-wave radar signal, the secondary laser radar signal, the secondary image signal and the secondary ultrasonic signal and according to the preset dynamic environment real-time modeling method;

inputting the motion parameter and the body shape parameter of the unmanned aerial vehicle into a secondary route planning model corresponding to the secondary three-dimensional environmental model based on a genetic algorithm to process so as to obtain an output of the secondary route planning model, wherein the motion parameter at least comprises a position parameter of the unmanned aerial vehicle, the output of the secondary route planning model comprises incapability of avoiding an obstacle or capability of avoiding the obstacle, and when the output of the secondary route planning model is incapability of avoiding the obstacle, the output of the secondary route planning model is further provided with a secondary obstacle avoiding route;

judging whether the output of the initial route planning model is capable of avoiding an obstacle or not;

generating a secondary obstacle avoiding flight instruction, based on a determination that the output of the initial route planning model is capable of avoiding an obstacle, to require the unmanned aerial vehicle to fly through the first environmental area in an obstacle avoiding manner along the secondary obstacle avoiding route.

2. The non-transitory computer-readable medium storing computer executable instructions for an unmanned aerial vehicle based on a multi-signal acquisition and route planning model according to claim 1, wherein the generating an initial three-dimensional environmental model according to the initial millimeter-wave radar signal, the initial laser radar signal, the initial image signal and the initial ultrasonic signal and according to a preset dynamic environment real-time modeling method comprises:
   conducting dynamic environment real-time modeling processing by adopting a preset first spatial modeling tool according to the initial millimeter-wave radar signal and the initial image signal so as to obtain a first spatial model;
   conducting dynamic environment real-time modeling processing by adopting a preset second spatial modeling tool according to the initial millimeter-wave radar signal and the initial ultrasonic signal so as to obtain a second spatial model;
   combining the first spatial model with the second spatial model in parallel as an initial three-dimensional environment model;
   the output of the initial route planning model comprises an output corresponding to the first spatial model and an output corresponding to the second spatial model; the output of the first spatial model comprises incapability of avoiding the obstacle or capability of avoiding the obstacle, and when the output of the first spatial model is capability of avoiding the obstacle, the output of the first spatial model is further provided with a first initial obstacle avoiding route; the output of the second spatial model comprises incapability of avoiding the obstacle or capability of avoiding the obstacle, and when the output of the second spatial model is capability of avoiding the obstacle, the output of the second spatial model is further provided with a second initial obstacle avoiding route; the judging whether the output of the initial route planning model is capable of avoiding the obstacle or not comprises:
   judging whether both the output corresponding to the first spatial model and the output corresponding to the second spatial model are capable of avoiding the obstacle or not;
   calculating a similarity value between the first initial obstacle avoiding route and the second initial obstacle avoiding route according to a preset route similarity calculating method based on a determination that both the output corresponding to the first spatial model and the output corresponding to the second spatial model are capable of avoiding the obstacle;
   judging whether the similarity value between the first initial obstacle avoiding route and the second initial obstacle avoiding route is greater than a preset similarity threshold value or not; and
   judging that the output of the initial route planning model is capable of avoiding the obstacle based on a determination that the similarity value between the first initial obstacle avoiding route and the second initial obstacle avoiding route is greater than the preset similarity threshold value.

3. The non-transitory computer-readable medium storing computer executable instructions for an unmanned aerial vehicle based on a multi-signal acquisition and route planning model according to claim 1, before the acquiring a motion parameter and a body shape parameter of the unmanned aerial vehicle and inputting the parameters into an initial route planning model corresponding to the initial three-dimensional environmental model based on a genetic algorithm to process so as to obtain an output of the initial route planning model, wherein the motion parameter at least comprises a position parameter of the unmanned aerial vehicle, the output of the initial route planning model comprises incapability of avoiding an obstacle or capability of avoiding the obstacle, and when the output of the initial route planning model is incapability of avoiding the obstacle, the output of the initial route planning model is further provided with an initial obstacle avoiding route, the executable instructions further comprising:
   retrieving an appointed standard environment model the most similar to the initial three-dimensional environment model from a preset environment model base, wherein the environment model base pre-stores a plurality of standard environment models obtained by modeling a plurality of air obstacle environments;
   acquiring an appointed route planning model corresponding to the appointed standard environment model according to a mapping relationship between the preset standard environment model and the route planning model, wherein the different standard environment models correspond to different route planning models based on the genetic algorithm; and
   marking the appointed route planning model as the initial route planning model and generating a route planning instruction, wherein the route planning instruction is used for indicating the motion parameter and the body shape parameter of the unmanned aerial vehicle and inputting the parameters into the initial route planning model corresponding to the initial three-dimensional environmental model based on the genetic algorithm to process.

4. The non-transitory computer-readable medium storing computer executable instructions for an unmanned aerial vehicle based on a multi-signal acquisition and route planning model according to claim 1, wherein after the judging whether the output is capable of avoiding an obstacle or not, the method comprises:
   controlling the unmanned aerial vehicle to retreat at a preset first horizontal length under a premise of keeping a current height based on a determination that the output of the initial route planning model is incapable of avoiding the obstacle;
   conducting signal acquisition processing on the second environmental area to obtain a third millimeter-wave radar signal, a third laser radar signal, a third image signal and a third ultrasonic signal by utilizing millimeter-wave radar, laser radar, a binocular vision camera and an ultrasonic transceiver pre-arranged on the unmanned aerial vehicle, wherein the second environmental area is an area obtained as the first environment area translates horizontally at the first horizontal length along a retreating direction of the unmanned aerial vehicle;
   generating a third three-dimensional environmental model according to the third millimeter-wave radar signal, the third laser radar signal, the third image signal and the third ultrasonic signal and according to the preset dynamic environment real-time modeling method;
   inputting the motion parameter and the body shape parameter of the unmanned aerial vehicle into a third route planning model corresponding to the third three-dimensional environmental model based on a genetic algorithm to process so as to obtain an output of the third route planning model, wherein the output of the third route planning model comprises incapability of avoiding an obstacle or capability of avoiding the obstacle, and when the output of the third route planning model is incapability of avoiding the obstacle, the output of the third route planning model is further provided with a third obstacle avoiding route;

judging whether the output of the third route planning model is capable of avoiding an obstacle or not; and generating a third obstacle avoiding flight instruction to require the unmanned aerial vehicle to fly through the second environmental area in an obstacle avoiding manner along the third obstacle avoiding route based on a determination that the output of the third route planning model is capable of avoiding an obstacle.

\* \* \* \* \*